US012472802B2

(12) United States Patent
Karsten et al.

(10) Patent No.: US 12,472,802 B2
(45) Date of Patent: Nov. 18, 2025

(54) ROOF LINING SYSTEM FOR MOTOR VEHICLES WITH AIR CONDITIONING FUNCTION, AND MOTOR VEHICLE COMPRISING ROOF LINING SYSTEM

(71) Applicant: Kautex Textron GmbH & Co. KG, Bonn (DE)

(72) Inventors: Milan Karsten, Bonn (DE); Sebastian Hoppe, Bonn (DE)

(73) Assignee: Kautex Textron Gmbh & Co. KG, Bonn (DE)

( * ) Notice: Subject to any disclaimer, the term of this patent is extended or adjusted under 35 U.S.C. 154(b) by 547 days.

(21) Appl. No.: 17/795,660

(22) PCT Filed: Jan. 29, 2021

(86) PCT No.: PCT/EP2021/052126
§ 371 (c)(1),
(2) Date: Jul. 27, 2022

(87) PCT Pub. No.: WO2021/152103
PCT Pub. Date: Aug. 5, 2021

(65) Prior Publication Data
US 2023/0076580 A1 Mar. 9, 2023

(30) Foreign Application Priority Data
Jan. 31, 2020 (DE) .................. 102020102507.6

(51) Int. Cl.
*B60H 1/24* (2006.01)
*B60H 1/34* (2006.01)
*B60R 13/02* (2006.01)

(52) U.S. Cl.
CPC ........... *B60H 1/245* (2013.01); *B60H 1/3407* (2013.01); *B60R 13/0212* (2013.01); *B60R 2013/0287* (2013.01)

(58) Field of Classification Search
CPC .............................. B60H 1/245; B60H 1/3407
See application file for complete search history.

(56) References Cited

U.S. PATENT DOCUMENTS 4,807,523 A * 2/1989 Radtke ..................... B60S 1/54
296/97.5
2008/0105754 A1* 5/2008 Baruschke ......... B60H 1/00735
454/155

(Continued)

FOREIGN PATENT DOCUMENTS

DE 102018222502 A1 6/2020
EP 0255004 A2 2/1988

(Continued)

OTHER PUBLICATIONS

Expanded Polypropylene (EPP), 2009, BPF https://www.bpf.co.uk/plastipedia/polymers/Expanded_Polypropylene_EPP.aspx (Year: 2009).*

(Continued)

*Primary Examiner* — Edelmira Bosques
*Assistant Examiner* — Michael James Giordano
(74) *Attorney, Agent, or Firm* — Occhiuti & Rohlicek LLP

(57) ABSTRACT

A roof lining system for motor vehicles, has an air supply connection for connecting the roof lining system to an air conditioning unit of the motor vehicle and at least one outflow device which is in fluid connection with the air supply connection. The outflow device has a central outflow region and a peripheral outflow region, which each have at least one separate air supply channel. Each outflow device has at least two flow actuators, with a first flow actuator being assigned to the central outflow region and a second flow actuator being assigned to the peripheral outflow region. The first flow actuator is arranged in the air supply channel of the central outflow region, and the second flow actuator is arranged in the air supply channel of the periph- (Continued)

Figure 1:
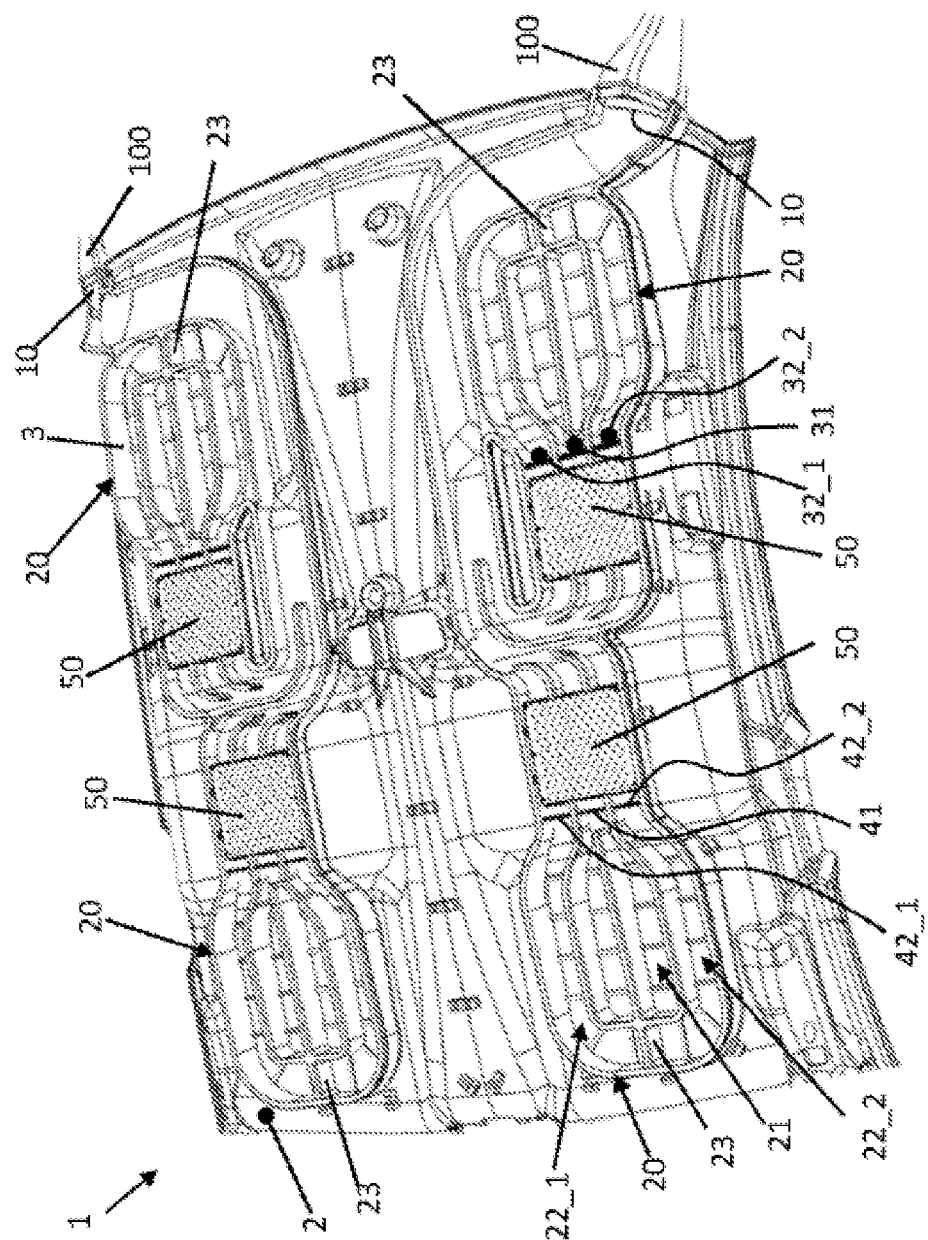

eral outflow region, and in that the peripheral outflow region at least partially surrounds the central outflow region.

13 Claims, 3 Drawing Sheets

(56) References Cited

U.S. PATENT DOCUMENTS

| | | | | |
|---|---|---|---|---|
| 2016/0355070 | A1* | 12/2016 | Kuttner | B60H 1/244 |
| 2018/0272841 | A1* | 9/2018 | Caliskan | B60H 1/245 |
| 2020/0247216 | A1* | 8/2020 | Cho | B32B 7/12 |
| 2020/0254847 | A1* | 8/2020 | Nakamura | B60H 1/00864 |

FOREIGN PATENT DOCUMENTS

| | | | |
|---|---|---|---|
| FR | 3054978 A1 | | 2/2018 |
| KR | 20110140032 A | * | 12/2011 |
| WO | 2016196930 A1 | | 12/2016 |
| WO | WO-2017021066 A1 | * | 2/2017 ......... B60H 1/00742 |

OTHER PUBLICATIONS

Textile—Determination of the permeability of fabrics, Jun. 15, 1995, ISO, ISO 9237:1995(E) (Year: 1995).*
International Search Report, PCT Application No. PCT/EP2021/052126, mailed Apr. 22, 2021 (4 pages).

* cited by examiner

ROOF LINING SYSTEM FOR MOTOR VEHICLES WITH AIR CONDITIONING FUNCTION, AND MOTOR VEHICLE COMPRISING ROOF LINING SYSTEM

CROSS REFERENCE TO RELATED APPLICATIONS

This application is a 371 National Phase application of PCT Application No. PCT/EP2021/052126, filed Jan. 29, 2021, which claims the benefit of the filing date of German Application No. 10 2020 102 507.6, filed Jan. 31, 2020, the contents of which are hereby incorporated by reference in their entirety.

The present invention relates to a roof lining system for motor vehicles, and to a motor vehicle having a roof lining system.

For the purpose of air conditioning a passenger cabin, motor vehicles frequently have an air conditioning device (also referred to as an air conditioning system) which is usually arranged in fluid connection with air outflow devices, for example in the region of the dashboard and/or in the region of a center tunnel (for front passengers). In correspondingly designed motor vehicles, an air-conditioned current of air (a heated and/or cooled and/or humidity-adjusted air current) is consequently emitted frontally onto passengers in the passenger cabin.

A corresponding frontal emission of conditioned air onto passengers can be perceived as unpleasant by the passengers, since the emitted, conditioned air currents can, for example, hit the passengers' eyes directly, which can lead to irritation of the eyes. Furthermore, such air currents can be perceived as unpleasant because body region directly exposed to the air current can cool down, which can lead to local cooling and associated muscle tension.

In order to counter this problem, DE 198 32 738 A1 discloses a motor vehicle in which the roof of a passenger cabin has an air distribution chamber which adjoins the passenger cabin with an air outlet wall extending in a plane along the two-dimensional surface of the ceiling. The air outlet wall is provided with a plurality of finely distributed openings through which the air supplied to the air distribution chamber enters the passenger cabin with air fronts distributed over a wide surface.

The roof lining system known from DE 198 32 738 A1 allows for a more even flow of air to the passengers in the passenger cabin. However, the air current emitted onto the passengers can still be perceived as unpleasant, particularly if the air current is at a temperature that differs greatly from the temperature in the passenger cabin—i.e., if the passenger cabin is heated up or cooled down significantly.

It is the object of the present invention to provide a roof lining system by means of which air, for example conditioned air, can be introduced into a passenger cabin of a motor vehicle, and which causes fewer irritations to passengers situated in the passenger cabin during operation.

The object of the present invention is achieved by an motor vehicle roof lining system having the features of claim 1. Advantageous embodiments of the roof lining system are described in the claims dependent on claim 1.

More specifically, the object of the present invention is achieved by a roof lining system for motor vehicles which has at least one air supply connection for connecting the roof lining system to an air conditioning unit of the motor vehicle, and at least one outflow device which is in fluid connection with the at least one air supply connection. The roof lining system according to the invention is characterized in that each outflow device has a central outflow region and a peripheral outflow region, each of which has at least one separate air supply channel. Consequently, the central outflow region has a central air supply channel, and the peripheral outflow region has at least one peripheral air supply channel. Each outflow device also has at least two flow actuators, with at least one first flow actuator being assigned to the central outflow region and at least one second flow actuator being assigned to the peripheral outflow region, wherein the at least one first flow actuator is arranged in the at least one air supply channel of the central outflow region, and the at least one second flow actuator is arranged in the at least one air supply channel of the peripheral outflow region, wherein the peripheral outflow region at least partially surrounds the central outflow region.

The roof lining system according to the invention has the advantage, among other things, that a passenger cabin of a motor vehicle configured with the roof lining system according to the invention can be air-conditioned efficiently, and substantially without drafts, such that passengers in the passenger cabin experience less irritation.

Because the peripheral outflow region at least partial surrounds the central outflow region, the air current emerging from the peripheral outflow region at least partially surrounds the air current emerging from the central outflow region. The air current emerging from the peripheral outflow region surrounds the air current emerging from the central outflow region in the form of a cocoon. This approach achieves a precisely targeted exposure for the passenger to an air current emerging from the roof lining system. The air currents emerging from the central outflow region and the peripheral outflow region can be adjusted independently of each other via the respective flow actuators assigned to the central outflow region and the peripheral outflow region, such that different body regions of a passenger can be exposed to currents of different strengths. For example, sensitive body regions of a passenger, such as the passenger's head, are exposed to lower air masses than other body regions of the passenger, such as the shoulder region of the passenger.

A further advantage of the roof lining system according to the invention is its simple structure, such that the roof lining system according to the invention can be produced inexpensively.

Yet another advantage of the roof lining system according to the invention is its greatly improved suitability for recycling compared to the roof lining systems and air conditioning systems known from the prior art. This is because roof lining systems known from the prior art have a multi-layer sandwich structure, which makes it considerably more difficult to recycle the materials used.

The at least one outflow device can be in fluid connection with the air conditioning unit of the motor vehicle by means of the at least one air supply connection. The respective outflow zones are designed to emit at least one, preferably at least two, air currents directed from a roof lining of the passenger cabin into the passenger cabin.

The central outflow region is preferably designed as at least one outlet opening of the roof lining system. The same applies to the peripheral outflow region, which is also designed as at least one additional outlet opening of the roof lining system.

The central outflow region and/or each of the central outflow regions has/have a width of between 90 mm and 190 mm. More preferably, the respective central outflow regions each have a width of between 100 mm and 180 mm, preferably between 110 mm and 165 mm, more preferably between 125 mm and 145 mm, even more preferably between 130 mm and 140 mm, and in particular 135 mm. The width of a central outflow region is to be understood as meaning the maximum extension of the central outflow region in the width direction of the roof lining system. The width of the roof lining system is the dimension that is oriented, in the installed position of the roof lining system— i.e., when the roof lining system is installed in a motor vehicle—transverse to its longitudinal extension, and thus transverse to the direction of travel of the motor vehicle.

The appropriately configured roof lining system has the advantage that the air conditioning via the roof lining system is perceived as pleasant, without the head region of a passenger, which is exposed to a flow of air, being perceived as either too warm or too cold.

Each flow actuator is configured to control an air current that is assigned to the outflow region associated with the flow actuator. The respective flow actuators are preferably designed as flow valves which can each be rotated about an axis of rotation between their closed position and their open position. The respective flow actuators are preferably continuously adjustable between their closed position and their open position.

The outflow device can also be referred to as an air outflow device. The at least one outflow device is preferably designed as a vertical outflow device, such that the air currents exiting from the central outflow region and from the peripheral outflow region are emitted essentially vertically from the roof lining into the passenger cabin.

The roof lining system preferably has more than one outflow device. The roof lining system preferably has at least two, more preferably at least three and even more preferably at least four outflow devices. More preferably, the roof lining system has a number of outflow devices corresponding to the number of passengers. The outflow devices are also preferably designed to be structurally identical to one another. More preferably, the roof lining system has further additional outflow devices for the windshield and/or for the rear window and/or for the side windows of the motor vehicle.

The roof lining system preferably has at least two air supply connections. More preferably, a first outflow device is in fluid connection with a first air supply connection. More preferably, a first and a second outflow device are in fluid connection with a first air supply connection. More preferably, a first and a second outflow device are in fluid connection with a first air supply connection, and a third and a fourth outflow device are in fluid connection with a second air supply connection.

The feature according to which the peripheral outflow region at least partially surrounds the central outflow region can also be expressed in such a way that when the outflow device is viewed from above, the peripheral outflow region bounds the central outflow region on at least two, preferably on at least three sides. In other words, this means that in a plan view of the outflow device, the peripheral outflow region surrounds the central outflow region over an angular range of more than 180°, for example 270°.

The peripheral outflow region preferably surrounds the central outflow region in such a way that a straight first axis runs through the peripheral outflow region twice in a first direction of extension of the outflow device, and through the central outflow region once, wherein a second straight axis which runs perpendicular to the first axis runs through the peripheral outflow region and the central outflow region once in a second direction of extension of the outflow device which is oriented perpendicular to the first direction of extension of the outflow device.

More preferably, the peripheral outflow region is U-shaped or V-shaped in plan view of the peripheral outflow region.

The roof lining system preferably has a number of heating devices corresponding to the number of outflow devices, for the purpose of heating an air current to be emitted by the respective outflow devices, wherein each heating device is arranged between the at least one air supply connection and an outflow device assigned to the heating device, and wherein the central outflow region and the peripheral outflow region of the respective outflow devices are in fluid connection via their respective air supply channels with the heating device assigned to the outflow device, wherein the central outflow region and the peripheral outflow region are positioned downstream of the heating device assigned to the outflow device.

The correspondingly designed roof lining system has the advantage that the on-board air conditioning unit only has to provide an air current at one temperature, wherein the respective heating devices heat the air currents emitted by the respective outflow devices in such a way that preset temperatures in the passenger cabin can be set and achieved in the different regions of the vehicle situated below the respective outflow devices.

The feature according to which the outflow regions (i.e., the central outflow region and the peripheral outflow region) are downstream of the heating device assigned to the outflow device is to be understood in such a way that the outflow regions are downstream of the heating device assigned to the outflow device with regard to the air current. Consequently, an air current discharged from the roof lining system follows the following path: Air conditioning device-→air supply connection→heater→outflow region.

The heating device or heating devices are preferably designed as a flow-through heating device or flow-through heating devices. For this purpose, each heating device has a passage through which the air current to be warmed is passed.

The roof lining system is preferably designed in such a way that the respective flow actuators are located downstream of the heating device.

Consequently, the respective flow actuators are downstream of the heater which is assigned to the same outflow device as the flow actuators.

The correspondingly designed roof lining system has the advantage that the air current to be heated flows through the respective heating devices of the roof lining system more evenly.

The roof lining system is preferably designed in such a way that the respective flow actuators are adjustable independently of each other between a closed position in which the air supply channel in which the flow actuator is arranged is closed by means of the flow actuator, and an open position in which the air supply channel in which the flow actuator is arranged is permeable to air.

The correspondingly designed roof lining system has the advantage that the air outflow from the central outflow region and the peripheral outflow region of each outflow device can be adjusted in such a way that different body regions of a passenger who is placed below an outflow device can be exposed to different amounts of air from the central outflow region and from the peripheral outflow region.

The roof lining system is preferably designed in such a way that the peripheral outflow region or the peripheral outflow regions of the respective outflow devices has or have at least two peripheral outflow zones, each of which has a separate air supply channel with a second flow actuator arranged in it, wherein the at least two peripheral outflow zones together at least partially surround the central outflow region.

The correspondingly designed roof lining system has increased flexibility with regard to the geometric design of the peripheral outflow region. A further advantage of the correspondingly designed roof lining system is that the air current to be emitted flows through the peripheral outflow region more evenly. Furthermore, the correspondingly designed roof lining system has the advantage that the peripheral outflow region can be designed to be larger.

More preferably, the roof lining system is designed such that at least one outflow device has a partition wall that is arranged between the at least two peripheral outflow zones, such that the at least two peripheral outflow zones are separated from each other by the partition wall.

The at least one outflow device of the correspondingly designed roof lining system is consequently designed in such a way that an air current introduced into one peripheral outflow zone cannot flow into the other peripheral outflow zone of the peripheral outflow region. The partition wall is directly adjacent to the two peripheral outflow zones.

The correspondingly designed roof lining system has the advantage that any turbulence from the peripheral outflow region is reduced or even avoided. This is because, without a corresponding partition wall between the peripheral outflow zones, the air currents of the two peripheral outflow zones would meet, which inevitably leads to swirling and corresponding turbulence.

The roof lining system is preferably designed in such a way that the second flow actuatorsan outflow device.

Consequently, the second flow actuators always have the same position—and are, for example, each in a closed position or each in an open position, or are each in a position between the open position and the closed position.

Preferably, the roof lining system has a base body, wherein the respective air supply channels are formed at least partially by walls extending away from the base body, and wherein the at least one outflow device is designed as at least one passage opening in the base body, wherein the central outflow region and the peripheral outflow region of the at least one outflow device are at least partially formed by walls extending away from the base body.

The correspondingly designed roof lining system has the advantage that it can be manufactured in one piece, by way of example. As a result, the production of the correspondingly designed roof lining system is particularly simple, since only a mold with a single molded part is required to produce it, such that the roof lining system can be produced, for example, in a blow molding process or in an injection molding process or by particle foaming or in some other manner. The roof lining system, and in particular the base body, with the walls forming the flow channels and the outflow devices, preferably is made of a plastics material, in particular expanded polypropylene.

More preferably, the roof lining system is designed in such a way that the base body and the walls are designed as a single piece.

More preferably, the roof lining system is designed such that the roof lining system has at least one cover that at least partially forms and/or delimits the respective air supply channels and/or the at least one outflow device and/or the at least one air supply connection.

The correspondingly designed roof lining system has the advantage that it can be manufactured in a simplified manner, and the tightness of the respective air supply channels can be produced in a simplified manner.

More preferably, the roof lining system is designed in such a way that the base body and/or the walls is/are made of expanded polypropylene.

The correspondingly designed roof lining system has the advantage that it is light in weight. A further advantage of the correspondingly designed roof lining system is its greatly improved suitability for recycling compared to the roof lining systems and air conditioning systems known from the prior art. This is because roof lining systems known from the prior art have a multi-layer sandwich structure, which makes it considerably more difficult to recycle the materials used. Furthermore, the correspondingly designed roof lining system has the advantage that the roof lining system has low thermal conductivity, and thus increased thermal insulation properties. In addition, the correspondingly designed roof lining system has both improved acoustic and improved mechanical damping properties. In addition, the correspondingly designed roof lining system has an advantageous elastic deformability, such that in the event of an accident, passengers are better protected when they come into contact with the roof lining system. Another advantage of the correspondingly designed roof lining system is that the mold for producing the roof lining system can be made of aluminum, for example, which leads to reduced tool costs for the mold and thus to reduced manufacturing costs of the roof lining system.

The roof lining system preferably has a textile through which an air current provided by the air conditioning unit must pass into a passenger cabin of the motor vehicle, the textile having an air permeability in the range between 500 mm/s and 2000 mm/s at a differential pressure of 100 Pa for a test area of 20 cm$^2$, according to DIN EN ISO 9237:1995-12.

The correspondingly designed roof lining system has the advantage that the air passing through the textile is homogenized and emerges from the textile in a uniformly distributed manner over the surface of the corresponding textile area.

The present invention is also based on the object of providing an improved motor vehicle by means of which air, for example conditioned air, can be introduced into a passenger cabin of the motor vehicle, and which, during operation, causes fewer irritations to passengers located in the passenger cabin.

The object of the present invention is achieved by a motor vehicle roof lining system having the features of claim 13.

More precisely, the object of the invention is achieved by a motor vehicle having an air conditioning unit for air conditioning a passenger cabin of the motor vehicle, the motor vehicle being characterized in that the motor vehicle has a roof lining system as described above, wherein the at least one air supply connection of the roof lining system is connected to the air conditioning unit, such that the air provided by the air conditioning unit can be introduced into the passenger cabin of the motor vehicle via the at least one outflow device of the roof lining system.

Figure 2:
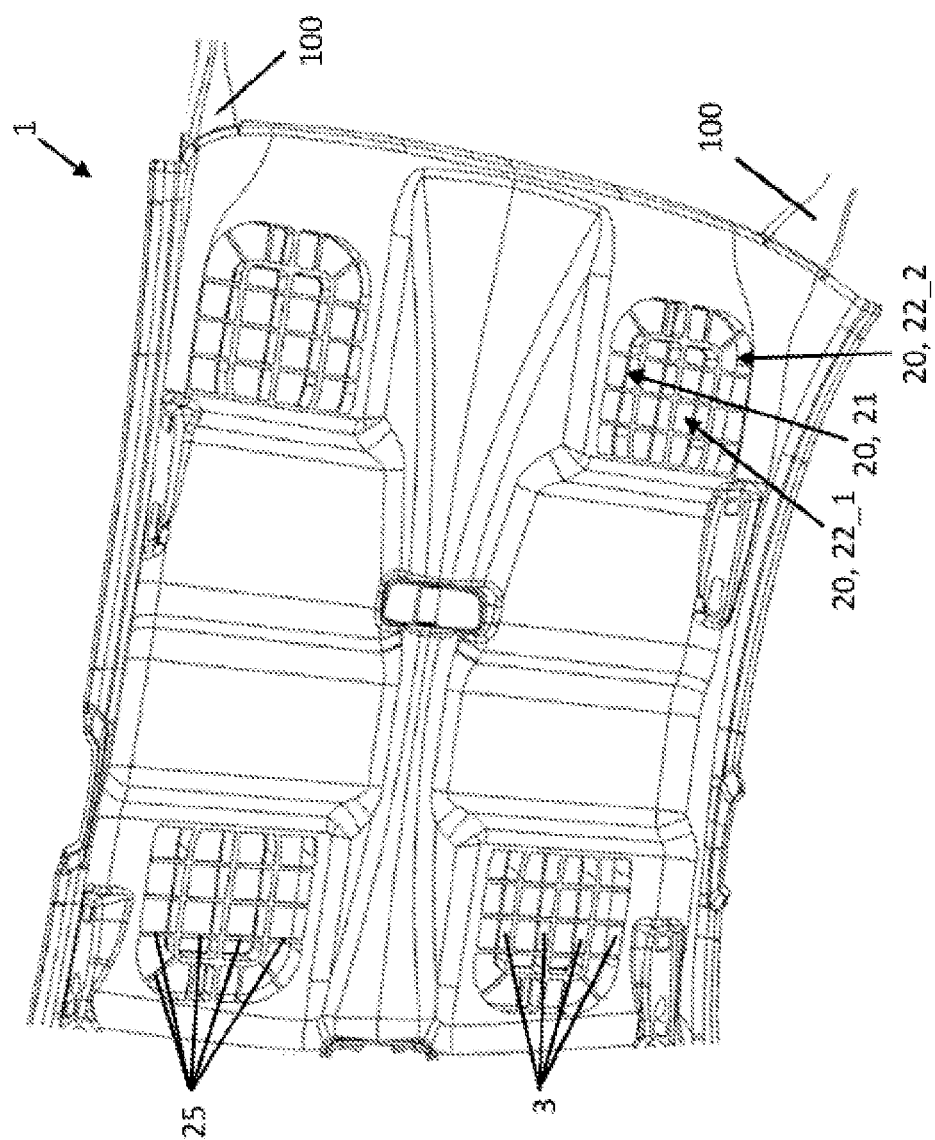
Figure 3:
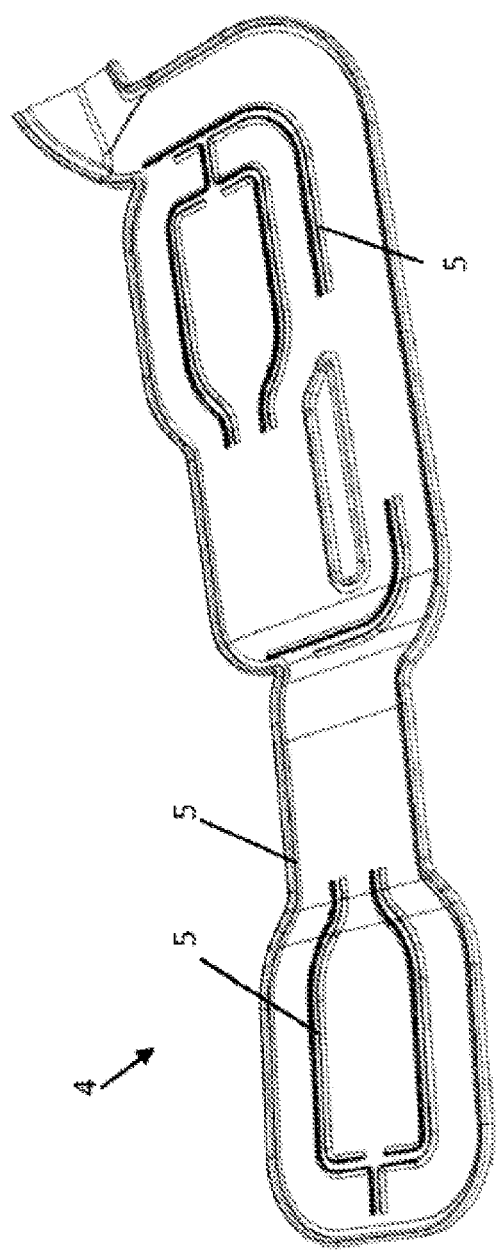

Further advantages, details, and features of the invention can be found below in the described embodiments. The drawings show, in detail, the following:

FIG. 1: is a perspective view of a roof lining system according to the invention, wherein the roof lining system is shown in such a way that a side of the roof lining system facing away from the passenger cabin is shown;

FIG. 2: shows the roof lining system shown in FIG. 1, wherein the roof lining system is shown in such a way that a side of the roof lining system facing the passenger cabin is shown; and FIG. 3: shows a covering of the roof lining system according to the invention.

In the following description, the same reference signs denote the same components or features, such that a description of a component with reference to a drawing also applies to the other drawings. This avoids repeating the description. Furthermore, individual features that have been described in connection with one embodiment can also be used separately in other embodiments.

A roof lining system 1 according to the invention is shown in FIGS. 1 and 2. FIG. 1 shows a side of the roof lining system 1 facing away from a passenger cabin, and FIG. 2 shows a side of the roof lining system 1 facing the passenger cabin.

In the embodiment shown, the roof lining system 1 according to the invention has two air supply connections 10 which are each in fluid connection with an air conditioning unit channel 100, the air conditioning unit channels 100 being connected to at least one air conditioning unit, which is also referred to as an air conditioning system. The air conditioning unit channels 100 are preferably arranged in a C-pillar or in a D-pillar of a motor vehicle.

The roof lining system 1 also has at least one outflow device 20. In the embodiment shown, the roof lining system 1 has four outflow devices 20, the outflow devices 20 shown on the left in FIG. 1 being assigned to front passengers of the motor vehicle, and the outflow devices 20 shown on the right in FIG. 1 being assigned to rear passengers of a motor vehicle.

As can be seen from FIG. 1, each of the outflow devices 20 is closed by a cover 4 on the side of the roof lining system 1 facing away from the passenger cabin. The cover 4 is shown on its own in FIG. 3. The corresponding design of the cover 4 will be dis-cussed further below.

As can be seen from FIGS. 1 and 2, each outflow device 20 has a central outflow region 21 and a peripheral outflow region 22_1, 22_2, wherein the central outflow region 21 has a separate air supply channel 31, and the peripheral outflow region 22_1, 22_2 in the embodiment shown has two separate air supply channels 32_1, 32_2.

It can be seen from the figures that the central outflow regions 21 each have a greater longitudinal extension than their width. However, the present invention is not limited to a corresponding configuration, since the width dimension of a central outflow region 21 can also correspond to the longitudinal extension of the central outflow region 21, or can even be greater than it.

It can be seen from FIGS. 1 and 2 that the roof lining system 1 has a base body 2, the respective air supply channels 31, 32_1, 32_2 being formed at least partially by walls 3 extending away from the base body 2. In more detail, the respective air supply channels 31, 32_1, 32_2 are formed by the walls 3 extending away from the base body 2 and by walls 5 of the cover 4, wherein the profile of the walls 5 corresponds to the profile of the walls 3 of the base body, and wherein the walls 5 are in direct contact with the walls 3 in the assembled state of the cover 4 with the base body 2.

The outflow devices 20 are designed as passage openings 20 of the base body 2, with the passage openings 20 being provided with stabilizing struts 25 on the side of the base body 3 facing the passenger cabin, such that a textile not shown in the figures is better supported by the corresponding struts 25.

As can be seen in particular from FIG. 1, both the central outflow region 21 and the peripheral outflow region 22_1, 22_2 are at least partially formed by the walls 3 extending away from the base body 2. It can also be seen that the base body 2 and the walls 3 are designed in one piece, such that the corresponding roof lining system 1 can be produced with a single mold, which leads to a reduction in the manufacturing costs of the roof lining system 1. Both the base body 2 and the walls 3 are preferably formed from expanded polypropylene. Expanded polypropylene has excellent cushioning properties. In addition, a suitably designed roof lining system 1 offers good protection in the event of an accident, for example for the head of an occupant of the motor vehicle.

As can be seen from FIG. 1, each outflow device 20 has three flow actuators 41, 42_1, 42_2. The first flow actuator 41 is assigned to the central outflow region 21, and the at least two second flow actuators 42_1, 42_2 are assigned to the peripheral outflow region 22_1, 22_2. The first flow actuator 41 is arranged in the air supply channel 31 of the central outflow region 21, and the two second flow actuators 42_1, 42_2 are arranged in the air supply channels 32_1, 32_2 of the peripheral outflow region 22_1, 22_2.

It can be seen from FIGS. 1 and 2 that the peripheral outflow region 22_1, 22_2 at least partially surrounds the central outflow region 21. In the embodiment shown, the peripheral outflow region 22_1, 22_2 surrounds the central outflow region 21 over an angular range of 270°. However, the present invention is not limited to a corresponding surrounding of the central outflow region 21 by the peripheral outflow region 22_1, 22_2, because the surrounding of the central outflow region 21 by the peripheral outflow region 22_1, 22_2 can preferably be implemented over an angular range between 180° and 360°. In the embodiment shown, the peripheral outflow region 22_1, 22_2 surrounds the central outflow region 21 in a U-shape.

It can be seen from FIG. 1 that the roof lining system 1 has a number of heating devices 50 corresponding to the number of outflow devices 20, to heat an air current to be emitted by the respective outflow devices 20. In the embodiment shown, the roof lining system 1 consequently has four heating devices 50 which are formed, for example, as flow-through heating devices 50, such that the air flowing through the heating device 50 is heated by means of the heating device 50.

The two heating devices 50, which are arranged in FIG. 1 in the upper region of the roof lining system are arranged between the air supply connection 10 shown at the top in FIG. 1 and each of the outflow devices 20 assigned to the respective heating devices 50. The two heating devices 50 shown at the bottom in FIG. 1 are arranged between the air supply connection 10 shown at the bottom in FIG. 1 and the outflow devices 20 assigned to the respective heating devices 50.

Both the central outflow region 21 and the peripheral outflow region 22_1, 22_2 of the respective outflow devices 20 are in fluid connection via their respective air supply channels 31, 32_1, 32_2 with a heating device 50 which is assigned to the outflow device 20. Both the central outflow region 21 and the peripheral outflow region 22_1, 22_2 are located downstream of the heating device 50 which is assigned to the outflow device 20. It can also be seen from FIG. 1 that the respective flow actuators 41, 42_1, 42_2 are each downstream of a heating device 50.

The respective flow actuators 41, 42_1, 42_2 can each be adjusted independently of each other between a closed position in which the air supply channel 31, 32_1, 32_2 in which the flow actuator 41, 42_1, 42_2 is arranged is closed by means of the flow actuator 41, 42_1, 42_2, and an open position in which the air supply channel 31, 32_1, 32_2 in which the flow actuator 41, 42_1, 42_2 is arranged is permeable to air. Advantageously, the respective second flow actuators 42_1, 42_2 of an outflow device 20 are synchronized. This means that the respective second flow actuators 42_1, 42_2 always have the same angular position and allow an identical air current to pass.

It can be seen in particular from FIG. 1 that the respective peripheral outflow regions 22_1, 22_2 of the respective outflow devices 20 each have at least two peripheral outflow zones 22_1, 22_2, each of which has a separate air supply channel 32_1, 32_2 with a second flow actuator 42_1, 42_2 arranged in it. The at least two peripheral outflow zones 22_1, 22_2 together at least partially surround the central outflow region 21—in the embodiment shown, over an angular range of 270°. As can be seen from FIG. 1, each outflow device 20 has a partition wall 23 which is arranged between the two peripheral outflow zones 22_1, 22_2, such that the at least two peripheral outflow zones 22_1, 22_2 are separated from each other by the partition wall 23. As a result, a reduction in turbulence below the peripheral outflow region 22_1, 22_2 is achieved.

LIST OF REFERENCE SIGNS

1 roof lining system
2 base body
3 walls (of the roof lining system/the base body)
4 cover
5 walls (of the cover)
10 air supply connection
20 outflow device, passage opening
21 central outflow region
22_1 peripheral outflow region, first peripheral outflow zone
22_2 peripheral outflow region, second peripheral outflow zone
23 partition wall
24 cover (of the outflow device)
25 stabilizing strut
31 air supply channel (of central outflow region)
32 air supply channel (of peripheral outflow region)
41 (first) flow actuator
42 (second) flow actuator
50 heating device
100 air conditioning unit channel

The invention claimed is:

1. A roof lining system for motor vehicles, comprising:
at least one air supply connection for connecting the roof lining system to an air conditioning unit of the motor vehicle;
at least two outflow devices which are in fluid connection with the at least one air supply connection,
wherein the roof lining system is characterized by the following features:
each outflow device has a central outflow region and a peripheral outflow region, each of which has at least one separate air supply channel;
each outflow device has at least two flow actuators, wherein at least one first flow actuator is assigned to the central outflow region, and at least one second flow actuator is assigned to the peripheral outflow region;
the at least one first flow actuator is arranged in the at least one air supply channel of the central outflow region, and the at least one second flow actuator is arranged in the at least one air supply channel of the peripheral outflow region; and
the peripheral outflow region at least partially surrounds the central outflow region;
wherein the peripheral outflow region surrounds the central outflow region over an angular range of more than 180°,
wherein the respective flow actuators can be adjusted independently of each other between a closed position in which the air supply channel in which the flow actuator is arranged is closed by means of the flow actuator, and an open position in which the air supply channel in which the flow actuator is arranged is permeable to air.

2. The roof lining system according to claim 1, characterized by the following features:
the roof lining system has a number of heating devices corresponding to the number of outflow devices, for the purpose heating an air current to be emitted by the given outflow device;
each heating device is arranged between the at least one air supply connection and an outflow device assigned to the heating device; and
the central outflow region and the peripheral outflow region of the respective outflow devices are in fluid connection via their respective air supply channels with the heating device which is assigned to the outflow device, wherein the central outflow region and the peripheral outflow region are downstream of the heating device which is assigned to the outflow device.

3. The roof lining system according to claim 2, the respective flow actuators are located downstream of the heating device.

4. The roof lining system according to claim 1, characterized by the following features:
the peripheral outflow region of the respective outflow devices has at least two peripheral outflow zones, each of which has a separate air supply channel with a second flow actuator arranged in it; and
the at least two peripheral outflow zones together at least partially surround the central outflow region.

5. The roof lining system according to claim 4, wherein at least one outflow device has a partition wall which is arranged between the at least two peripheral outflow zones, such that the at least two peripheral outflow zones are separated from each other by the partition wall.

6. The roof lining system according to claim 4, wherein the second flow actuators of an outflow device are synchronized.

7. The roof lining system according to claim 1, characterized by the following features:
the roof lining system has a base body;
the respective air supply channels are at least partially formed by walls extending away from the base body;
the at least two outflow devices are each designed as at least one passage opening of the base body; and
the central outflow region and the peripheral outflow region of the at least two outflow devices are each at least partially formed by walls extending away from the base body.

8. The roof lining system according to claim 7, wherein the base body and the walls are designed as a single piece.

9. The roof lining system according to claim 7, wherein the roof lining system has at least one cover which covers the respective air supply channels and/or the at least two outflow devices and/or at least partially forms and/or delimits the at least one air supply connection.

10. The roof lining system according to claim 7, wherein the base body and/or the walls is/are formed from expanded polypropylene.

11. The roof lining system according to claim 1 wherein the roof lining system has a textile through which an air current provided by the air conditioning unit must pass into a passenger cabin of the motor vehicle, the textile having an air permeability in the range between 500 mm/s and 2000 mm/s at a differential pressure of 100 Pa, based on a test area of 20 cm$^2$, according to DIN EN ISO 9237:1995-12.

12. The roof lining system according to claim 1, wherein the roof lining system has at least one further additional outflow device, by means of which a windshield and/or a rear window and/or a side window of the motor vehicle can be subjected to a flow of air provided by the air conditioning unit.

13. A motor vehicle having an air conditioning unit for air conditioning a passenger cabin of the motor vehicle, the motor vehicle wherein the motor vehicle has a roof lining system according to claim 1, wherein the at least one air supply connection of the roof lining system is connected to the air conditioning unit, such that air provided by the air conditioning unit can be introduced into the passenger cabin of the motor vehicle via the at least two outflow devices of the roof lining system.

* * * * *